United States Patent [19]

Hammons

[11] Patent Number: 4,748,764
[45] Date of Patent: Jun. 7, 1988

[54] FISHING JIGGER

[76] Inventor: Richard N. Hammons, R.R. #1, Box 100B, Columbus Junction, Iowa 52738

[21] Appl. No.: 61,631

[22] Filed: Jun. 15, 1987

[51] Int. Cl.$^4$ .................. A01K 91/00; A01K 93/00
[52] U.S. Cl. .................................. 43/43.1; 43/43.13; 43/44.87
[58] Field of Search ............ 43/43.1, 42.47, 42.22, 43/43.13, 19.2, 44.87, 4.5

[56] References Cited

U.S. PATENT DOCUMENTS

| | | | |
|---|---|---|---|
| 2,597,288 | 5/1952 | Caldwell | 43/43.13 |
| 3,181,266 | 5/1965 | Leufvenius | 43/43.13 |
| 3,818,624 | 6/1974 | Duffy | 43/43.13 |

Primary Examiner—Gene P. Crosby
Attorney, Agent, or Firm—Henderson & Sturm

[57] ABSTRACT

The fishing jigger disclosed here is a product having upper and lower parts or members, the upper of which is of bouyant material constituting a water-borne support for the lower part which is an immersed or submerged blade of such weight and frontal surface area as to offer considerable resistance to horizontal displacement of the jigger when subjected to forces applied to the jigger generally normal to the aforesaid frontal area. The float is a horizontally elongated cylinder from the underside of which the blade depends to present a substantially planar area lying in the plane of the horizontal or long axis of the cylindrical float. A free-running fishing line passes through the blade for jigging a hook or lure therefrom.

6 Claims, 1 Drawing Sheet

FISHING JIGGER

BACKGROUND AND SUMMARY OF THE INVENTION

Fishing bobbers, floats and like devices abound but none so far as is known functions to retain or substantially retain its position in the water when subjected to pulling forces exerted by the fishing line; that is to say, such forces tend to move prior devices in the direction of the source of the force. In casting situations, this requires that the bobber or the like be retrieved and a new cast effected. In most cases, what is required is that the jigger or like object remain substantially in place while the tensional force on the fishing line is converted to a vertical force applied to the lure, hook etc. so as to "jig" the lure etc.

According to the present invention the problem of retaining the jigger in place, or substantially in place, is solved by a float to which is attached a depending water-immersed resistance blade which will be cross-wise of the substantially horizontal force exerted by the fishing line, whereby the line that is passed through an opening in the jigger and extends below to the lure, hook etc. may be jigged or raised and lowered to create movement to attract fish. The float and blade are so configured that the weighted blade is carried in immersed or submerged mode by the water-borne float. The float itself preferably has a low profile above water so as not to be adversely affected by winds. The float may have cup-like recesses to supplement the water-impinged frontal surface of the blade. In addition to resisting movement is response to the force noted above, the below-water width of the blade resists turning of the jigger about a vertical or near vertical axis.

The foregoing and other features of the invention will become apparent as a preferred embodiment of the invention is disclosed in detail in the ensuing description and accompanying sheet of drawings.

DETAILED DESCRIPTION OF A PREFERRED EMBODIMENT OF THE INVENTION

It should be observed at the outset that the invention is capable of many configurations and sizes, depending, for example, on the types and sizes of fish being sought. Likewise, the jigger may be constructed of any of several types of materials, examples of which will be noted in the description of the preferred embodiment chosen to illustrate the principles of the invention.

Figure 1:
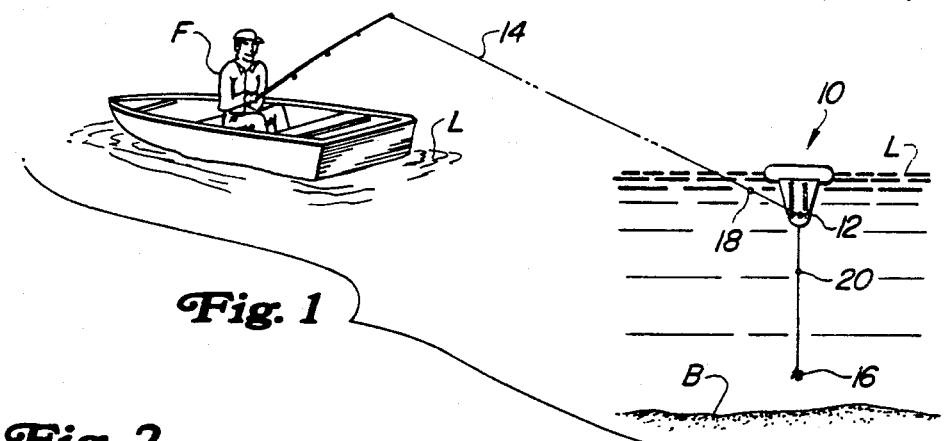
FIG. 1 is a schematic or "environmental" illustration of the use of the jigger, portions of the fishing line being omitted to conserve space.
Figure 2:
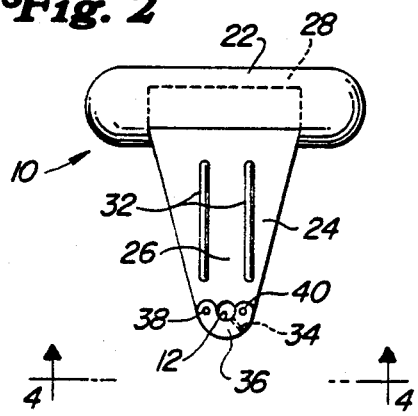
FIG. 2 is a front view of the jigger.
Figure 3:
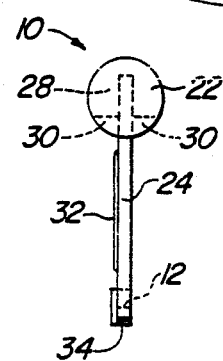
FIG. 3 is an end view.

Reference will be had first to FIG. 1 for an explanation of the use of the jigger in a casting situation. The jigger per se is denoted by the numeral 10 and has a through opening 12 therein through which a fishing line 14 is loosely passed. The water level of a body of water being fished is indicated by the letter L. The fishing line extends from a fisherman F to the jigger and, passing through the hole 12, continues downwardly to the lure, hook, etc. as at 16, shown here as terminating above the bottom B of the body of water. Typical split shot are used on the line at 18 and 20 respectively above and below the hole in the jigger. These provide adjustable stops for limiting movement of the line 14 through the hole 12. For example, the shot 18 will limit the depth to which the lure etc. can descend, and the shot 20 will limit the upward movement of the line below the jigger, the shot of course being larger than the hole 12. Thus, and assuming the jigger to be stationary, or nearly so, the hole 12 functions as a pulley about (through) which the line may be moved back and forth, or up and down as concerns the line portion below the jigger. Obviously, if the line is pulled by the fisherman to and beyond the engagement of the lower shot 20 with the jigger, the resistance of the jigger to movement will be overcome and it can be retracted or drawn into the extent desired by the fisherman.

In the selected embodiment of the invention, the jigger 10 comprises a float member or body 22 and a blade member 24. The body may be of any suitable bouyant material, several types of which are well known, and is here shown as being an elongated cylinder with rounded or hemispherical ends, although, as will appear elsewhere throughout this disclosure, the float may assume many shapes and sizes, depending upon the fishing objective involved. The blade is attached to the underside of the float in any acceptable fashion and is weighted so as to depend into the water, as best depicted in FIGS. 1, 2, 3 and 5. The weighting of the blade may be the result of forming it of material heavier than the float or of adding weighting elements, such as shot. The basic concept is that the float is water-borne and the weighted blade becomes immersed or submerged in the water. In various embodiments, it may be that the float rides the water somewhat below the surface of the water, but, in any event, the immersion of the blade into the water is significant from the standpoint of enabling it to function as a flap or resistance because of its relatively large frontal surface area 26.

Figure 4:
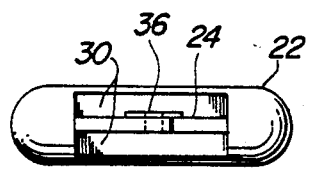
FIG. 4 is an edge view as seen along the line 4—4 on FIG. 2.
Figure 5:
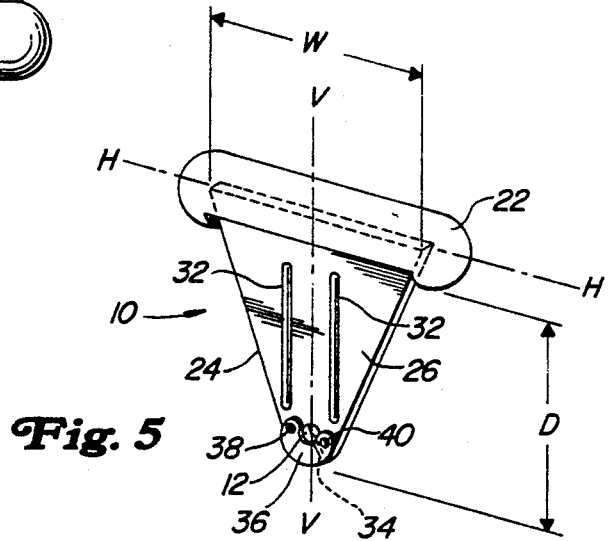
FIG. 5 is a perspective to which has been applied several lines and axes in the interests of clarifying the broader aspects of the invention.

This area is best explained by reference to FIG. 4 where the blade is shown as being flat and triangular, having a width W and a depth D, which dimensions are chosen so as to produce the frontal surface area 26. In the disclosed embodiment, the cylindrical float has a lengthwise horizontal axis H—H which is intersected midway between the ends of the float by a vertical axis V—V. In the selected embodiment, the overall length of the float is in the order of three and one-half to four inches and the float diameter is about one inch. The dimension D may be two to two and three-quarters inches and the dimension W may be on the same order. In the present case, the blade lies substantially in the plane that includes the axes H—H and V—V. Depending upon the type of material of which the blade is made, the thickness may be about one-eighth of an inch. In the present case, the upper end of the blade is fitted into the float as suggested at 28 in FIGS. 2 and 3; although, as already stated, any means of affixation may be utilized. In the present case, the arrangement results in a pair of cup- or scoop- like recesses 30, one in front of and the other behind the upper portion of the blade. These supplement the blade's resistance characteristics. Further, the blade may be made of thinner material if provided with reenforcing ribs 32.

In the interests of presenting a jigger having at least a fairly attractive overall appearance, the blade is symmetrical at opposite sides of the line V—V (FIG. 5), and the float has a relatively low profile so as to be substantially free from disturbance by the wind. Also, in this instance, the hole or through opening 12 is provided at the apex of the blade, although other locations on the jigger may be exploited. In order to facilitate entry of the line into the hole 12, an entry slot 34 is provided and normally closed by an arcuate latch 36 pivoted at 38 and having a snap-in/snap-out device 40. The edges of the hole and latch should be smoothly rounded in order to avoid excessive wear on the fishing line reeved through it. The weight of the jigger will vary according to its size and could range between one-quarter of an ounce to four ounces.

In use in casting, the line is loosely received in the hole 12 in the jigger and split shots added as shown, which may require some experimentation depending upon the distance of the cast. The jigger and related elements (lure, etc.) are cast to a selected distance and, assuming that the split shots have been adequately located, the jigger will assume the status shown in FIGS. 1 and 5; i.e., the float will be water-borne and the blade will be immersed in the water. The jigger may be used also without the split shots, etc. or other stops that would limit the extent that the line can be "jigged". In any event, the jigger according to the invention will tend to remain in place, or nearly so, despite back-and-forth and up-and-down movement of the line that results from jigging, mainly because pulls on the line will be generally normal to the frontal surface of the blade and this area acts as a flap resisting line forces, which may involve line friction at the hole 12 or weight of the line plus its attachments below the jigger.

Although the blade has been shown and described as being rigid or substantially so and imperforate except for the hole 12, it may be otherwise formed and shaped in keeping with its objective of providing adequate resistance for the purposes described herein. Likewise, the float may vary as to shape or size so long as it performs its function of supporting the immersed blade.

Features and advantages of the invention, other than those pointed out herein, will occur to those versed in the art, as will many modifications in the preferred embodiment of the invention, all without departure from the spirit and scope of the invention.

I claim:

1. A fishing jigger, comprising: a float member operative in a water-borne mode and a blade member affixed to the float member and weighted to depend into the water below the water-borne float member, the blade member being so configured as to present a frontal, water-immersed surface area offering substantial resistance to movement of the jigger by forces applied to the jigger generally normal to the surface area of the blade member, and one of the members having a through opening therein with means for loose passage of a free-running fishing line relative to the fishing jigger.

2. A fishing jigger according to claim 1, in which the float member has a frontal recess exposed to the water and serving to supplement the resistance effect of the frontal area of the blade member.

3. A fishing jigger according to claim 1, in which the opening is in the blade member closely adjacent to the lower terminal part of the blade member.

4. The fishing jigger according to claim 1, in which the float member has opposite end portions spaced apart horizontally as respects the water-borne mode of the float member, and the blade member frontal surface has such width as to extend substantially between said end portions.

5. A fishing jigger according to claim 4, in which the blade member surface area is substantially symmetrical at opposite sides of a vertical line centered between the float member end portions.

6. A fishing jigger according to claim 5, in which the float member has a horizontal axis extending between said end portions and intersecting said vertical axis, and the blade member surface area lies substantially in a plane that includes both of said axes.

* * * * *